(12) United States Patent
Wallace et al.

(10) Patent No.: US 7,004,985 B2
(45) Date of Patent: Feb. 28, 2006

(54) RECYCLE OF HYDROGEN FROM HYDROPROCESSING PURGE GAS

(75) Inventors: Paul S. Wallace, Katy, TX (US); Kay A. Johnson, Missouri City, TX (US); Janice L. Kasbaum, Seabrook, TX (US); Alma I. Rodarte, Stafford, TX (US)

(73) Assignee: Texaco, Inc., White Plains, NY (US)

( * ) Notice: Subject to any disclaimer, the term of this patent is extended or adjusted under 35 U.S.C. 154(b) by 934 days.

(21) Appl. No.: 09/946,186

(22) Filed: Sep. 5, 2001

(65) Prior Publication Data
US 2003/0041518 A1    Mar. 6, 2003

(51) Int. Cl.
*C01B 3/24*    (2006.01)

(52) U.S. Cl. .................. 48/198.3; 48/127.1; 423/650
(58) Field of Classification Search .............. 48/127.1, 48/197 R, 198.3; 252/373; 423/418.2, 650
See application file for complete search history.

(56) References Cited

U.S. PATENT DOCUMENTS

| | | | |
|---|---|---|---|
| 4,181,503 A | 1/1980 | Lesieur et al. | 48/196 A |
| 5,152,975 A | 10/1992 | Fong et al. | 423/652 |
| 5,152,976 A | 10/1992 | Fong et al. | 423/652 |
| 5,968,347 A | 10/1999 | Kolodziej et al. | 208/213 |
| 6,114,400 A | 9/2000 | Nataraj et al. | 518/715 |
| 6,613,125 B1 * | 9/2003 | Wallace et al. | 95/55 |

* cited by examiner

*Primary Examiner*—Colleen P. Cooke
(74) *Attorney, Agent, or Firm*—Cantor Colburn LLP

(57) ABSTRACT

The present invention relates to an integrated gasification and hydroprocessing process. A hydrocarbonaceous fuel is first gasified to produce syngas, and then a portion of the hydrogen is removed from the syngas. The hydrogen is compressed and used as an excess reactant in a hydroprocessing unit. Hydrogen gas is recovered from the hydroprocessing unit product, purified, compressed and recycled to the hydroprocessing unit. The hydrogen-poor syngas is expanded in an expander that drives the compressor that compresses the recycled hydrogen gas. The expanded syngas is then combined with light hydrocarbons removed from the recycle hydrogen gas stream, combusted in a gas turbine and used for power generation.

14 Claims, 1 Drawing Sheet

RECYCLE OF HYDROGEN FROM HYDROPROCESSING PURGE GAS

BACKGROUND OF THE INVENTION

The process and advantages of gasifying hydrocarbonaceous material into synthesis gas, or syngas, are generally known in the industry. In high temperature gasification processes, synthesis gas is commonly produced from gaseous combustible fuels, such as natural gas, and solid combustible organic fuels, such as coal, residual petroleum, wood, tar sand, shale oil, and municipal, agriculture or industrial waste. The gaseous or solid combustible organic fuels are reacted with a reactive oxygen-containing gas, such as air, enriched air, or pure oxygen, and a temperature modifier, such as steam, in a gasification reactor to obtain the synthesis gas.

In a typical gasification process, the synthesis gas will substantially comprise hydrogen ($H_2$), carbon monoxide (CO), and lessor quantities of impurities, such as water ($H_2O$), carbon dioxide ($CO_2$), carbonyl sulfide (COS) and hydrogen sulfide ($H_2S$). The synthesis gas is commonly treated to remove or significantly reduce the quantity of impurities, particularly $H_2S$, COS, and $CO_2$ before being utilized in a downstream process. A number of acid gas removal systems are commercially available and selection will depend on the degree of sulfur compounds and carbon dioxide removal required by the process and the operating pressure of the acid gas removal system.

The hydrogen can then be harvested from the synthesis gas and used as an excess reactant in a hydroprocessing unit. Hydroprocessing covers various refinery operations, including, but not limited to, catalytic desulfurization, denitrification, hydrotreating to remove other contaminants, pretreatment of reformer feedstocks, and hydrocracking to break down heavy hydrocarbon materials. The remaining components of the syngas, primarily carbon monoxide and a small portion of hydrogen, can then be consumed in a combustion turbine for power production.

The hydrocracking unit is the most versatile of refinery conversion units. It can process a wide range of feedstocks from naphtha to asphalt to yield any desired product with a molecular weight lower than that of the feedstock. Hydrotreating is the most widely used catalytic refinery process and can treat feedstocks from the lightest naphthas to the heaviest vacuum resids. It is used primarily to remove undesired impurities, such as sulfur containing compounds, from the feedstocks. Both hydrocracking and hydrotreating utilize hydrogen as a reactant. Catalytic cracking is similar to hydrocracking, except that no hydrogen is used. In each process, a catalyst is used which can become deactivated by any metal or solid impurities found in the feedstock, as well as by any coke produced in the process.

Because the hydrogen is usually fed to the hydroprocessing unit in excess, hydrogen is present in the product stream of the unit. It is desirable to recover this hydrogen for recycle back to the inlet of the hydroprocessing unit. Due to pressure reductions in the hydrogen during processing, though, the hydrogen needs to be compressed for recycle back to the hydroprocessing unit. Thus, it would be desirable to develop an economical process to boost the hydrogen pressure for use as a recycle stream.

SUMMARY OF THE INVENTION

The present invention relates to an integrated gasification and hydroprocessing process. A hydrocarbonaceous fuel is first gasified to produce syngas. The syngas is purified to remove impurities, most commonly hydrogen sulfide, and then a portion of the hydrogen is removed from the syngas. This can be done my any means known to remove hydrogen sulfide gas from a hydrogen gas containing stream, but is preferably accomplished using membrane separation or a pressure swing adsorption unit.

The recovered hydrogen is compressed and used as an excess reactant in a hydroprocessing process, including, but not limited to, desulfurization, denitrification, hydrotreating to remove other contaminants, and hydrocracking. Because excess hydrogen is used in the hydroprocessing process, hydrogen gas can be recovered from the hydroprocessing unit product. This hydrogen gas, which usually contains light hydrocarbon gasses, is purified to remove any contaminants, and compressed for recycle back to the hydroprocessing unit. The light hydrocarbons are removed from the recycle hydrogen stream prior to the hydrogen is introduced back into the hydroprocessing unit.

The hydrogen-poor syngas is expanded in an expander that drives the compressor that compresses the recycled hydrogen gas, thereby maximizing the efficiency of the process. The expanded syngas is then combined with light hydrocarbons removed from the recycle hydrogen gas stream, and combusted in a gas turbine for power generation.

BRIEF DESCRIPTION OF THE DRAWINGS

The FIGURE illustrates a preferred embodiment of the present invention.

DESCRIPTION OF ILLUSTRATIVE EMBODIMENTS

Figure 1:
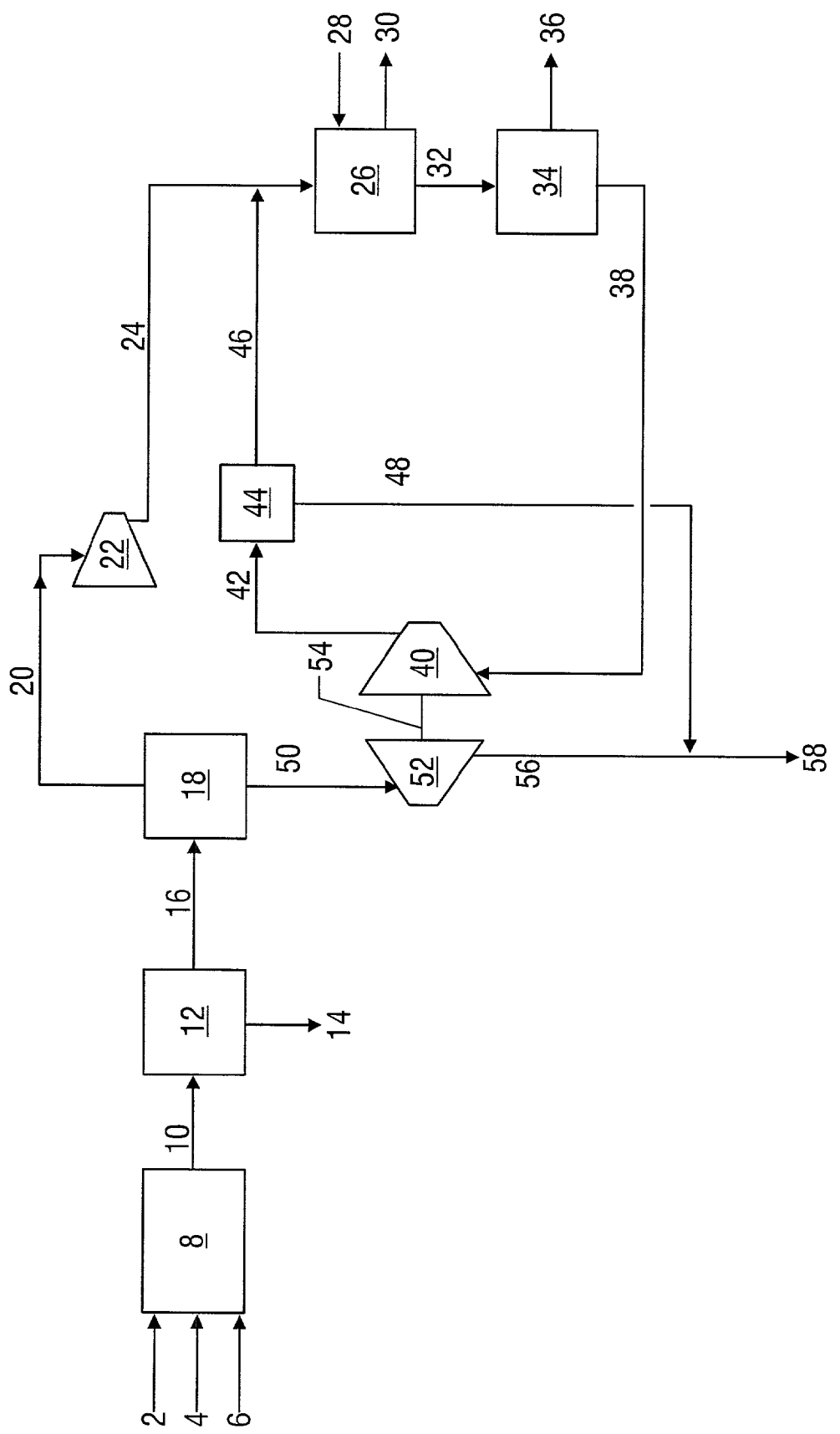

In the instant invention, carbonaceous fuel is first obtained and prepared for feeding to a gasification reactor. Carbonaceous fuel is any solid, liquid, or gaseous combustible organic material that can be used as feedstock to a gasification process for produce synthesis gas production. The feedstock for a gasification process is usually a hydrocarbonaceous material, that is, one or more materials, generally organic, which provide a source of hydrogen and carbon for the gasification reaction. The hydrocarbonaceous material can be in a gaseous, liquid or solid state, or in a combination as desired, for example, a solid-liquid composition in a fluidized state.

The feed preparation step may not be necessary, given the composition and physical nature of the feedstock. Generally, solid carbonaceous fuels will need to be liquefied with oil or water prior to feeding to the gasifier. Liquid and gaseous carbonaceous fuels may be suitable for direct feed to the gasifier, but can be pre-treated for removal of any impurities that might be present in the feed.

The term liquid hydrocarbonaceous fuel as used herein to describe various suitable feedstocks is intended to include pumpable liquid hydrocarbon materials and pumpable liquid slurries of solid carbonaceous materials, and mixtures thereof. For example, pumpable aqueous slurries of solid carbonaceous fuels are suitable feedstocks. In fact, substantially any combustible carbon-containing liquid organic material, or slurries thereof may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuel feedstocks to the gasifier, is intended to include various materials, such as liquefied petroleum gas, petroleum distillates and residua, gasoline, naphtha, kerosene, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof, (3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

Gaseous hydrocarbonaceous fuels that may be burned in the partial oxidation gasifier alone or along with the liquid hydrocarbonaceous fuel includes vaporized liquid natural gas, refinery off-gas, $C_1$–$C_4$ hydrocarbonaceous gases, and waste carbon-containing gases from chemical processes.

After the feed preparation step, if used, the carbonaceous fuel is sent to a gasification reactor, or gasifier. In the gasifier, the carbonaceous fuel is reacted with a reactive free oxygen-containing gas. The term free-oxygen containing gas as used herein means air, oxygen-enriched air i.e. greater than 21 mole % $O_2$, and substantially pure oxygen, i.e. greater than about 95% mole oxygen (the remainder usually comprising $N_2$ and rare gases). Substantially pure oxygen is preferred, such as that that is produced by an air separation unit (ASU). The partial oxidation of the hydrocarbonaceous material is completed, advantageously in the presence of a temperature control moderator such as steam, in a gasification zone to obtain hot synthesis gas, or syngas. Syngas and synthesis gas can and are used interchangeably throughout this specification.

The need for a temperature moderator to control the temperature in the reaction zone of the gas generator depends in general on the carbon-to-hydrogen ratios of the feedstock and the oxygen content of the oxidant stream. A temperature moderator is commonly used with liquid hydrocarbon fuels with substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the feed injector. Other temperature moderators include $CO_2$-rich gas, nitrogen, and recycled synthesis gas.

A gasification reactor generally comprises a reaction zone, made up of a vertical cylindrically shaped steel pressure vessel lined with refractory, and a quench drum, such as shown in U.S. Pat. No. 2,809,104, which is incorporated herein by reference. A feed injector, such as shown in U.S. Pat. No. 2,928,460, which is incorporated herein by reference, may be used to introduce the feed streams into the reaction zone. In the reaction zone of a gasifier, the contents will commonly reach temperatures in the range of about 1,700° F. (927° C.) to 3,000° F. (1649° C.), and more typically in the range of about 2,000° F. (1093° C.) to 2,800° F. (1538° C.). Pressure will typically be in the range of about 1 psi (101 kPa) to about 3675 psi (25,331 kPa), and more typically in the range of about 200 psi (1378 kPa) to about 2000 psi (13,782 kPa), and even more typically in the range of about 800 psi (5513 kPa) to about 1200 psi (8269 kPa). See U.S. Pat. No. 3,945,942 describing a partial oxidation feed injector assembly. See U.S. Pat. No. 5,656,044 describing a method and an apparatus for the gasification of organic materials. See also U.S. Pat. Nos. 5,435,940, 4,851,013, and 4,159,238 describing a few of the many gasification processes known in the prior art. The entire disclosures of the above referenced patents are hereby incorporated by reference and relied upon.

The hot gasification process product synthesis gas, or syngas, comprises carbon monoxide and hydrogen. Other materials often found in the synthesis gas include hydrogen sulfide, carbon dioxide, ammonia, cyanides, and particulates in the form of carbon and trace metals. The extent of the contaminants in the feed is determined by the type of feed and the particular gasification process utilized as well as the operating conditions. In any event, the removal of these contaminants is preferable to make gasification a viable process, and acid gas (e.g. $CO_2$ and $H_2S$) removal is very advantageous.

As the synthesis gas is discharged from the gasifier, it passes into the gasification quench chamber for cleaning. The turbulent condition in the quench drum, caused by large volumes of gases bubbling up through the water helps the water to scrub much of the solids from the effluent gas. Large quantities of steam are generated within the quench vessel and saturate the syngas stream. The stream of raw gas is cooled in the quench chamber and leaves at a temperature in the range of about 350° F. to 600° F. (about 175° C. to 315° C.), such as about 450° F. to 550° F. (about 230° C. to 290° C.), and a pressure in the range of about 500 to 2500 psia, such as about 1000 psia. Advantageously, fresh quench water is a mixture of make-up water and condensate produced subsequently in the process.

After being discharged from the gasifier, the synthesis gas can be sent to an acid gas removal unit so that the impurities in the syngas can be removed. The acid gas removal facilities for the synthesis gas, usually employing amine or physical solvents, removes the acid gases, particularly hydrogen sulfide, from the mixed synthesis gas/purge gas stream. The acid gas removal facilities typically operate at low temperatures. After the synthesis gas is cooled to below about 265° F. (130° C.), preferably below about 195° F. (90° C.), the contaminants in the gas, especially sulfur compounds and acid gases, can be readily removed. The synthesis gas is contacted with the solvent in an acid gas removal contactor. The contactor may be of any type known to the art, including trays or a packed column. Operation of such an acid removal contactor is known in the art. Hydrogen sulfide from the acid gas removal unit is usually routed to a sulfur recovery process, with any recovered carbon dioxide being vented to the atmosphere.

After being processed in the acid gas removal step, the syngas is sent to an hydrogen purification step, preferably made up of a membrane and/or pressure swing adsorption (PSA) unit for $H_2$ purification and production. The synthesis gas can be separated with a gas separation membrane into a hydrogen-rich gas and a hydrogen-depleted gas. A gas separation membrane system allows small molecules like hydrogen to selectively pass through the membrane (permeate) while the larger molecules ($CO_2$, CO) do not pass through the membrane (no-permeate).

The gas separation membrane can be of any type which is preferential for permeation of hydrogen gas over carbon dioxide and carbon monoxide. Many types of membrane materials are known in the art which are highly preferential for diffusion of hydrogen compared to nitrogen, carbon monoxide and carbon dioxide. Such membrane materials include: silicon rubber, butyl rubber, polycarbonate, poly (phenylene oxide), nylon 6,6, polystyrenes, polysulfones, polyamides, polyimides, polyethers, polyarylene oxides, polyurethanes, polyesters, and the like. The gas separation membrane units may be of any conventional construction, and a hollow fiber type construction is preferred.

The synthesis gas or mixed gas stream enters the membrane at high pressure, typically between about 800 psi (5,515 kPa) and about 1600 psi (11,030 kPa), more typically between about 800 psi (5,515 kPa) and about 1200 psi (8,273 kPa). The gas temperature is typically between about 50° F. (10° C.) to about 212° F. (100° C.), more typically between about 68° F. (20° C.) and about 122° F. (50° C.). The gas separation membrane allows small molecules like hydrogen to pass through (permeate) while the larger molecule ($CO_2$, CO) do not pass through (non-permeate). The permeate experiences a substantial pressure drop of between about 500 psi (3,447 kPa) to about 700 psi (4,826 kPa) as it passes through the membrane. The hydrogen-rich permeate is therefore typically at a pressure of from about 100 psi (689 kPa) to about 700 psi (4826 kPa), more typically between about 300 psi (2,068 kPa) to about 600 psi (4,136 kPa). The hydrogen rich permeate may contain between about 95 to about 97 mole percent hydrogen gas.

An alternative means for effecting the purification is a Pressure Swing Adsorption (PSA) unit which removes the impurities from the raw stream by use of a pressure change on the adsorbent beds. In conventional processes, the raw syngas stream would typically undergo treatment with an amine solution, followed by a methanation process, followed by a copper liquor washing process and, finally, followed by a molecular sieve dryer process.

While the preferred means for effecting the purification of the raw effluent stream is by way of the membrane and/or PSA unit, it is to be understood that conventional means for purifying the raw $H_2$ stream can be employed, if desired, in the process of the present invention. The hydrogen purification step usually causes a reduction in the pressure of the hydrogen-enriched stream, so it usually has to be compressed prior to use in the hydroprocessing unit, typically to a pressure of about 1000 psi (6900 kPa) to about 2000 psi (13800 kPa).

The non-permate hydrogen-poor syngas stream from the first hydrogen separation unit can then be utilized for power generation. Preferably an expander/compressor combination unit may be used to simultaneously increase the pressure of a recycle hydrogen stream, discussed below, and to reduce the pressure of the hydrogen-poor syngas going to the combustion turbine. The hydrogen-poor syngas is combined with a hydrocarbon stream from a second hydrogen purification step on a recycle hydrogen stream, discussed below, the combination is then combusted, and the combusted gas is expanded to produce power by an electric generator driven by an expansion turbine. The heating value and the composition of the hydrogen-poor syngas stream is an important consideration when using it as fuel for power production. Thus, additional fuel, such as natural gas, may need to be added to the hydrogen-poor syngas stream to increase the heating value of the combustor feed stream. As stated, hydrogen-poor syngas stream is combined with hydrocarbons from a second hydrogen purification step, discussed below, which may supply sufficient additional heating value to the hydrogen-poor syngas stream.

The hydrogen rich permeate from the first hydrogen purification step is then used for hydroprocessing, for example, hydrotreating or hydrocracking, a hydrocarbon stream. Hydroprocessing covers various refinery operations, including, but not limited to, catalytic desulfurization, denitrification, hydrotreating to remove other contaminants, pretreatment of reformer feedstocks, and hydrocracking to break down heavy hydrocarbon materials.

Hydrogen serves several important functions in hydroprocessing. For example, hydrogen reacts with mercaptans, disulfides, benzothiophenes and the like to form hydrogen sulfide, thereby desulfurizing the feedstock. Hydrogen reacts with quinoline and other nitrogen compounds to form ammonia. Hydrogen facilitates the cracking of polycyclic aromatics. Finally, operating in a hydrogen-rich environment reduces the formation of tar and coke, prolonging catalyst life and increasing reactor cycle time.

The hydrogen demands of a reactor vary, depending on the specifics of the operation being performed, and may be as low as 200 scf/bbl or less for desulfurization of naphtha or virgin light distillates, 500–1,000 scf/bbl for treating atmospheric resid, upwards of 1,000 scf/bbl for treatment of vacuum resid, and as high as 5,000–10,000 scf/bbl for hydrocracking. Thus, the hydrogen demand of the hydroprocessing unit is an important consideration when processing the syngas in the first hydrogen purification step. It is within the contemplation of the present invention that only a portion of the syngas be sent to the first hydrogen purification step, with the balance bypassing that step and being recombined with the non-permeate prior to being expanded.

Modern refineries often carry out treating and cracking operations together, such as in multi-stage reactors, where the first stage predominantly converts sulfur compounds and the second stage predominantly performs the cracking step. In conventional hydroprocessing, fresh feed is mixed with hydrogen and recycle gas and fed to the reactors, where the desired reactions take place in the presence of a suitable catalyst. As a result, light components that can be formed include methane, ethane, other light hydrocarbons, hydrogen sulfide and ammonia. The reactor effluent is passed to a first separation section, where the effluent is maintained at high pressure, but reduced in temperature, usually in at least two or three stages. At least a portion of the resulting overhead vapor, which typically contains 80% hydrogen or more, is recirculated to the hydroprocessing reactors as a hydrogen recycle stream. The liquids from the first phase-separation section are passed to a second phase-separation section, where the pressure is lowered, thereby flashing off a light hydrocarbon stream, which is typically sent to the fuel gas line. The liquids from the separators are sent for fractionation, or to another destination as appropriate.

The hydrogen recycle stream usually contains gaseous hydrocarbons and impurities, most likely hydrogen sulfide. It is preferable that these impurities be removed prior to recycling the hydrogen stream back to the hydroprocessing unit. Thus, an adsorption column can be added to the acid gas removal facility described above for this purpose. The hydrogen recycle stream can be routed to this column, where hydrogen sulfide is removed from the hydrogen recycle stream by counter current contact with a solvent that selective removes hydrogen sulfide. Such solvents are known in the art. The column may be of any type known to the art, including trays or a packed column. Operation of such an acid removal contactor is known in the art. Hydrogen sulfide from the acid gas removal unit is usually routed to a sulfur recovery process, preferably the same sulfur recovery process utilized in the purification of the syngas.

A sweetened hydrogen recycle stream exits the column, and is available for further processing prior to being recycled to the hydroprocessing unit.

Due to pressure losses in the hydroprocessing unit, the hydrogen recycle stream will need to be compressed. Instead of using power or steam to drive a compressor, the compression is preferably done in a combined compressor/expander unit on a single shaft on a common skid. In this combined compressor/expander unit, the hydrogen recycle stream is compressed using energy from the expansion of the aforementioned hydrogen-poor syngas stream. The pressure of the hydrogen-poor syngas stream is lowered by in an expander, and the power generated therefrom can be used to compress the hydrogen recycle stream. The compressor discharge pressure should be set sufficiently high to allow for pressure drop in the subsequent second hydrogen purification step and other system losses so that the hydrogen recycle stream can be reintroduced into the hydroprocessing unit.

After being compressed, the hydrocarbon containing hydrogen stream is processed in a second hydrogen purification step so as to remove the hydrocarbons from the stream. This is preferably done in a membrane system or PSA unit as described above. Alternatively, a hydrocarbon-selective membrane can be used to reduce the concentration of hydrocarbons and contaminants in the hydrogen stream that is recycled to the hydroprocessing reactor, as is shown and described in U.S. Pat. No. 6,190,540 to Lokhandwala, et al. The hydrogen rich product from the second hydrogen purification step is then combined with the hydrogen from the first hydrogen purification step and sent to the hydropropcessing unit.

It has been found that the hydrocarbons rejected from the second hydrocarbon purification step make a good fuel for combustion turbines. The pressure of the hydrocarbon stream should remain high enough to be combined with the expanded hydrogen-poor syngas stream prior to its introduction into the combustor of the gas turbine.

Frequently, the combustor feed stream is mixed with a diluent gas, such as nitrogen gas or water vapor, and then fed to the combustor of a gas turbine for power production. The mass flow of the diluent gas, preferably nitrogen, helps to increase the power generation and reduce NOx gasses produced by the combustion of the syngas in the gas turbine combustor. Due to the introduction of saturated $N_2$ and saturated fuel gas, the concentration of oxides of nitrogen ($NO_x$) in the exhaust gas is substantially nil, below 20 ppm (vol) on dry 15% $O_2$ basis.

Air is also commonly added to the combustor feed stream. The air is compressed by means of a turbocompressor that is driven by the coaxial expansion turbine which along with the combustor are the principal parts of the gas turbine. The compressed air enters the combustor at a temperature in the range of about 400° F. to 850° F. (about 425° C. to 455° C.) and at substantially the same pressure as the hydrogen-poor syngas/hydrocarbon mixture and optional diluent gas. A portion of the compressed air can also provide feed air to an air separation unit (ASU) that provides oxygen to the gasification step and nitrogen as diluent to the gas turbine.

An ASU is used to separate air into separate streams of substantially pure oxygen gas and nitrogen gas. A portion or all of the nitrogen gas is saturated with water, superheated, and introduced into the combustor of a gas turbine along with the stream of hydrogen-poor syngas/hydrocarbon mixture and optional fuel gas. The stream of oxygen gas from the ASU is usually introduced into the reaction zone of the gasifier by way of one passage in an annulus-type feed injector.

The hot exhaust gas leaving the expansion turbine portion of the gas is passed through a conventional heat recovery steam generator (HRSG) prior to being discharged to the atmosphere. Steam for operating a conventional steam turbine comprising a high pressure expansion turbine in tandem with a coaxial intermediate expansion turbine, and steam for process needs, is produced in the HRSG. For example, superheated high pressure steam from the HRSG can be introduced into a high pressure expansion turbine (HPT) for power production. Intermediate pressure exhaust steam leaves the HPT and can also be superheated in the HRSG, and introduced into an intermediate pressure expansion turbine (IPT) to produce additional power. Power production using steam is very similar to power production using combusted gas. The steam is expanded through expansion turbines to drive electric generators for the production of electricity. A portion of the produced steam could be used as the temperature moderator in the gasification unit, or to superheat the hydrogen-poor syngas/hydrocarbon mixture/diluent feed stream to the gas turbine. The balance of the steam, preferably as much steam as possible, is used in the steam turbines for power production.

Referring now to the FIGURE, hydrocarbonaceous fuel 2, free-oxygen containing gas 4, and a temperature moderator 6 are all fed to gasification reactor 8, producing syngas 10. Syngas 10 is then processed in an acid gas removal unit 12, where hydrogen sulfide 14 is removed from the syngas 10 and usually sent to a sulfur recovery unit. The sweet syngas 16 is then processed in a first hydrogen purification unit 18. This unit can be any such unit known in the art, but is preferably a membrane unit or a pressure swing adsorption unit. The hydrogen 20 is compressed in compressor 22, and compressed hydrogen 24 is sent to the hydroprocessing unit 26. The hydroprocessing unit can be any known in the art, and is used for such things as desulfurization, denitrification, hydrotreating and hydrocracking operations. A sour hydrocarbon feed 28 is usually fed to the hydroprocessing unit 26, and a sweetened feed 30 product is recovered.

Because hydrogen is fed to the hydroprocessing unit 26 in excess, the gas stream 32 removed from the unit 26 usually comprises mostly hydrogen, with some light hydrocarbons and impurities present as well. It is desirable to recycle this stream back to the hydroprocessing unit. The recycle stream 32 is thus purified in a second acid gas removal unit 34, where impurties, again usually hydrogen sulfide 36, are removed. The sweet hydrogen recycle stream 38 is then compressed in compressor 40 so as to increase the pressure of the stream so the hydrogen can be recycled back to the hydroprocessing unit 26. The compressed hydrogen recycle stream 42 is processed in a second hydrogen purification step 44, preferably in a membrane unit or a pressure swing adsorption unit, where the hydrocarbons 48 are removed from the hydrogen recycle stream 42. The purified hydrogen 46 is then combined with the hydrogen 24 from the first hydrogen purification unit 18 and fed to the hydroprocessing reactor 26.

The hydrogen-poor syngas 50 from the first hydrogen purification unit 18 is usually at a high pressure. This excess pressure is not necessary for processing in the combustor of a downstream gas turbine, so it is desirable to reduce that pressure. It is preferred that the hydrogen-poor syngas 50 is expanded in expander 52, which provides power to drive shaft 54 and provide power to compressor 40 to compress the hydrogen recycle stream 38. The hydrocarbons 48 removed from the compressed hydrogen recycle stream 42 in hydrogen purification step 44 are combined with the expanded syngas 56, and are sent in combination to a gas turbine via line 58 for power production.

The above illustrative embodiments are intended to serve as simplified schematic diagrams of potential embodiments of the present invention. One of ordinary skill in the art of chemical engineering should understand and appreciate that specific details of any particular embodiment may be different and will depend upon the location and needs of the system under consideration. All such layouts, schematic alternatives, and embodiments capable of achieving the present invention are considered to be within the capabilities of a person having skill in the art and thus within the scope of the present invention.

While the apparatus, compounds and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention.

What is claimed is:

1. An integrated gasification and hydroprocessing process comprising:
   reacting a hydrocarbonaceous fuel with a free oxygen containing gas to produce syngas comprising hydrogen;
   removing a portion of the hydrogen from the syngas;
   expanding the syngas in an expander;
   processing the hydrogen and make-up hydrogen in a hydroprocessing unit, producing a hydroprocessing unit gas product comprising purge hydrogen and purge hydrocarbons;
   compressing the hydroprocessing unit gas product in a compressor, wherein the compressor is driven by power generated from the expander;
   separating the purge hydrogen from the purge hydrocarbons in the hydroprocessing unit gas product; and
   supplying the purge hydrogen as the make-up hydrogen to the hydroprocessing unit.

2. The process of claim 1 further comprising purifying the syngas prior to removing hydrogen from the syngas.

3. The process of claim 2, wherein the purification of the syngas comprises removing hydrogen sulfide from the syngas.

4. The process of claim 1, wherein the hydrogen is removed from the syngas using a pressure swing adsorption unit.

5. The process of claim 1, wherein the hydrogen is removed from the syngas using membrane separation.

6. The process of claim 1, wherein the hydrogen is compressed prior to being processed in the hydroprocessing unit.

7. The process of claim 1 further comprising purifying the hydroprocessing unit gas product prior to compressing the hydroprocessing unit gas product in the compressor.

8. The process of claim 7, wherein the purification of the hydroprocessing unit gas product comprises removing hydrogen sulfide from the purge gas.

9. The process of claim 8, wherein the hydrogen sulfide is removed from the hydroprocessing unit gas product by counter current contact with a solvent that selectively removes hydrogen sulfide.

10. The process of claim 1, wherein the purge hydrogen is separated from the purge hydrocarbons in the hydroprocessing unit gas product using a pressure swing adsorption unit.

11. The process of claim 1, wherein the purge hydrogen is separated from the purge hydrocarbons in the hydroprocessing unit gas product using membrane separation.

12. The process of claim 1 further comprising processing the expanded syngas in a gas turbine to produce power.

13. The process of claim 1 further comprising processing the purge hydrocarbons in a gas turbine to produce power.

14. The process of claim 1, wherein the hydroprocessing unit is selected from the group consisting of a hydrodesulfurization unit, a denitrification unit, and a hydrocracking unit.

* * * * *